United States Patent
Eide et al.

(10) Patent No.: US 11,194,864 B2
(45) Date of Patent: Dec. 7, 2021

(54) SYSTEMS AND METHODS FOR ANONYMIZED STATISTICAL DATABASE QUERIES

(71) Applicants: Sebastian Probst Eide, Berlin (DE); Paul Francis, Kaiserslautern (DE); Cristian Daniel Berneanu, Bucharest (RO); Saša Jurić, Zagreb (HR); Paweł Obrok, Cracow (PL)

(72) Inventors: Sebastian Probst Eide, Berlin (DE); Paul Francis, Kaiserslautern (DE); Cristian Daniel Berneanu, Bucharest (RO); Saša Jurić, Zagreb (HR); Paweł Obrok, Cracow (PL)

(73) Assignees: AIRCLOAK GMBH, Kaiserslautern (DE); MAX PLANCK GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 252 days.

(21) Appl. No.: 15/366,449

(22) Filed: Dec. 1, 2016

(65) Prior Publication Data
US 2017/0329873 A1    Nov. 16, 2017

Related U.S. Application Data

(60) Provisional application No. 62/333,910, filed on May 10, 2016.

(30) Foreign Application Priority Data

May 10, 2016   (EP) .................................. 16169000

(51) Int. Cl.
*G06F 16/00* (2019.01)
*G06F 16/903* (2019.01)
(Continued)

(52) U.S. Cl.
CPC ........ *G06F 16/90335* (2019.01); *G06F 7/582* (2013.01); *G06F 21/6227* (2013.01); *G06F 21/6254* (2013.01)

(58) Field of Classification Search
CPC ............... G06F 17/30979; G06F 7/582; G06F 21/6227; G06F 21/6254; G06F 17/30864;
(Continued)

(56) References Cited

U.S. PATENT DOCUMENTS

2011/0277037 A1\* 11/2011 Burke .................... G06F 21/60
726/26
2012/0143922 A1   6/2012 Rane et al.
(Continued)

FOREIGN PATENT DOCUMENTS

WO        2014143208        9/2014

OTHER PUBLICATIONS

Istemi Ekin Akkus, String Discovery for Private Analytics, Technical Report MPI-SWS-2013-006 (Year: 2013).\*
(Continued)

*Primary Examiner* — Ashish Thomas
*Assistant Examiner* — Suman Rajaputra
(74) *Attorney, Agent, or Firm* — Grogan, Tuccillo & Vanderleeden, LLP

(57) ABSTRACT

A computer system contains a module configured to receive a query, to request rows and columns from a data store, to add or remove rows in such a way that combinations of queries cannot be used to infer information about individuals in the data store. The module executes a statistical computation over the adjusted rows and columns to produce a perturbed answer so that neither the perturbed answer alone, nor repeats of the perturbed answer can be used to infer information about individuals in the data store.

18 Claims, 4 Drawing Sheets

Row Adjustment with Removable Attack Components

(51) Int. Cl.
*G06F 21/62* (2013.01)
*G06F 7/58* (2006.01)

(58) Field of Classification Search
CPC ......... G06F 17/30867; G06F 17/30286; G06F 17/30595; G06Q 30/02
See application file for complete search history.

(56) References Cited

U.S. PATENT DOCUMENTS

| | | | |
|---|---|---|---|
| 2014/0143239 A1* | 5/2014 | Fu | G06F 16/24578 707/723 |
| 2015/0007249 A1* | 1/2015 | Bezzi | G06F 21/6227 726/1 |
| 2016/0335455 A1* | 11/2016 | Mohan | G06F 21/6254 |
| 2017/0093906 A1* | 3/2017 | Bhargav-Spantzel | H04L 63/1433 |
| 2020/0327252 A1* | 10/2020 | Mcfall | G06F 21/602 |

OTHER PUBLICATIONS

Korean Office Action dated Nov. 14, 2018 issued in the corresponding Korean Application No. 10-2017-0057518.

\* cited by examiner

Generation of a Fixed-random Number

Embodiment of Fixed-random number generation using a Pseudo-Random Number Generator (PRNG)

Answer Perturbation for Median Operation

Answer Perturbation for Max Operation

Answer Perturbation for Sum Operation

Row Adjustment with Removable Attack Components

SYSTEMS AND METHODS FOR ANONYMIZED STATISTICAL DATABASE QUERIES

CROSS-REFERENCE TO RELATED APPLICATIONS

This Application claims priority to U.S. Provisional Application Ser. No. 62/333,910, filed on May 10, 2016, which is incorporated herein by reference in its entirety. This Application additionally claims priority to European Patent Application Serial No. EP 16/169,000, filed on May 10, 2016, which is also incorporated herein by reference in its entirety.

BACKGROUND

Technical Field

The present invention relates to statistical methods for data analysis. Certain embodiments relate to anonymization of responses produced from database queries.

Discussion of Art

It is often desired that an analyst be able to obtain statistical data from a database containing user information without being able to learn anything about individual users in the database. Simply removing names or identification numbers from the database is not effective to prevent individual privacy loss. For instance, if an analyst knows the birthdate, gender, and zip code of an individual in the database (the victim), this alone is often enough information to uniquely identify the victim. The analyst can then form a query specifying this information plus some sensitive information the analyst wishes to learn about the victim, and obtain the answer. For instance, "what is the sum of the salaries of all male individuals born on Dec. 14, 1957, with zip code 67663?" If there is only one such person, the sum of salaries will be that person's salary.

In early prior art, a mechanism to defend against this was simply to not provide an answer unless there are at least K individuals represented in the answer. However, this defense can often be easily circumvented. For instance, the analyst may make the following two queries: 1) "what is the sum of the salaries of all males?", and 2) "what is the sum of the salaries of all males not born on Dec. 14, 1957 and having zip code 67663?" The first query includes all males, whereas the second query includes all males except the victim. By subtracting the second sum from the first, the victim's salary can be computed.

Other prior art addresses this problem by modifying the data in the database itself. One approach is to add noise to numerical values in the database. Another approach is to swap specific fields between users. Yet another approach, called K-anonymity, is to remove the accuracy of data values so that each user in the database looks the same as K-1 other users. These approaches, and their variants, can provide strong anonymity, but often destroy the utility of the data itself. Furthermore, these approaches are complex to configure, often resulting in errors that weaken the strength of the anonymity.

Another prior art approach, "differential privacy," is a method of anonymization whereby responses to queries from a database take the form of numerical answers, and random noise is added to the numerical answers. The phrase "noisy numerical answer" refers to the number that is produced by adding random noise to a numerical answer.

To give an example of how this works, suppose the query is "How many users are there that are male, are born on Dec. 14, 1957, with zip code 67663, and have a salary between $90,000 and $100,000?" The true numerical answer would be 1 or 0, depending on whether the user (the victim of the query) has that salary or not. Suppose that random noise with a normal distribution and standard deviation of 5 is added. Now the answer might well be 6, or negative 8. The analyst would have no idea whether the victim has that salary or not, thus protecting that victim's privacy. On the other hand, suppose that the query is "How many males in zip code 67663 have a salary between $90,000 and $100,000?" If the true numerical answer is 513, the noisy numerical answer might be for instance 510 or 518. As a result, the analyst obtains a reasonably accurate answer. In this way, a differentially private system can provide both privacy and accuracy.

The problem comes when the analyst is allowed to repeat the query. Assuming the first query, each noisy numerical answer would be taken from a random distribution with an expected value of either 0 or 1. With enough such noisy answers, the analyst could take the average and have high confidence of the true answer.

The generally known solution to this problem is to limit the number of times an analyst may query a differentially private database. However, this is not practical, as repeated identical queries may be useful and important in cases for instance where the contents of a database are constantly changing, so that identical queries may produce different results at different times.

Accordingly, there is a need for an anonymizing method and system that is easy to configure and improves the privacy of database systems while still providing useful analytics.

BRIEF DESCRIPTION

Embodiments of the present invention provide an anonymization module whose input is a query, whose output is a perturbed statistical answer, and which interacts with a data store by requesting tables consisting of rows and columns. In an embodiment, the module identifies attack components in the query that can influence the rows in the tables, and removes the effect of those attack components when very few users in the table are influenced by the attack components. The module tests the influence of attack components by removing the component, or by adjusting the range specified by the component. Accordingly, the module defends against attacks that use the difference between queries to infer information about individual users.

In an embodiment, the module perturbs the statistical answer such that it is highly unlikely that information about individual users can be inferred from either a single answer, or from repeated instances of a single answer. This is done by adding enough noise that the effect of both average and outlying user values are hidden, and by ensuring that the output is derived from a group of users.

In an embodiment, the module uses fixed-random numbers for both adding noise and for threshold-based decisions. A fixed-random number is taken from a pseudo-random distribution in such a way that the same set of user IDs produces the same pseudo-random number.

In an embodiment, an anonymizing method for a database system is provided. The method includes the steps of: receiving a query; identifying attack components in the query; and requesting rows and columns from a data store appropriate for testing the attack components. The method further includes determining which attack components, when removed or adjusted, lead to a user identification ("UID") difference smaller than a fixed threshold; and adding or removing rows relative to those matching said query to remove the effect of said attack components. The method further includes applying a statistical operation to the resulting row-adjusted table; and outputting the resulting answer.

In embodiment, a non-transitory computer readable medium is provided. The non-transitory computer readable medium stores instructions configured to adapt a controller that includes at least one processor and a memory device to: receive a query; identify attack components in the query; and request rows and columns from a data store appropriate for testing the attack components. The stored instructions further adapt the controller to: determine which attack components, when removed or adjusted, lead to a UID difference smaller than a fixed threshold; and add or remove rows relative to those matching said query to remove the effect of said attack components. The stored instructions further adapt the controller to: apply a statistical operation to the resulting row-adjusted table; and output the resulting answer.

These and other objects, features and advantages of the present invention will become apparent in light of the detailed description thereof, as illustrated in the accompanying drawings.

DRAWINGS

The present invention will be better understood from reading the following description of non-limiting embodiments, with reference to the attached drawings, wherein below:

DETAILED DESCRIPTION

Figures 1, 2:
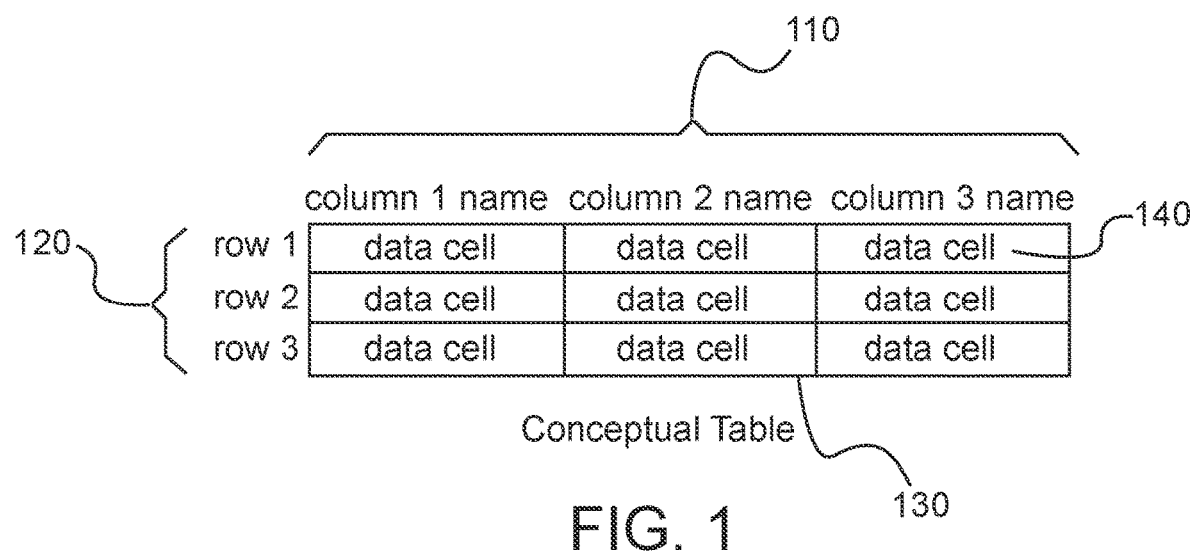
FIG. 1 shows schematically a conceptual representation of data as a table with columns and rows in accordance with an embodiment of the invention.
FIG. 2 shows schematically a conceptual table with a column containing UIDs in accordance with an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly.

Referring to FIG. 1, an embodiment of the present invention operates on data stored in a storage medium, e.g., a database/data store. Conceptually, in embodiments, the data is a table 130 consisting of data cells 140 organized as rows 120 and columns 110. Physically, in embodiments, the data does not have to be stored as rows and columns per se, as long as semantically the data can be referenced as a table of rows and columns. In embodiments, each column may have a name, and each data cell (or just cell for short) may be numeric, a string, or any other data type.

In embodiments, the conceptual table may have a column that identifies the entity being protected by the present invention. The entity would typically be a person, but may also be, for instance, a device that a person uses, like a smart phone or a car, or any other entity whose privacy should be protected. Referring to FIG. 2, this document refers to these entities as users, to the column as the UID column 230, and to the cell values 210 and 220 as the UIDs. Each user in the table may have a unique UID 210 and 220, which may be for instance a string or a number. In embodiments, the cells for any given row contain information about the user identified by that row's UID. The same UID may appear in multiple rows, for instance user2 220 in FIG. 2.

An embodiment of the present invention is herein referred to as a "cloak," e.g., a computer having at least one processor and a memory device and is operative to execute one or more of the methods disclosed herein. The software that implements the cloak may be integrated into for instance the software that implements the data store/database. Alternatively, the software that implements the cloak may stand alone, and interact with the data store through a well-defined standard interface. In this latter case, the hardware that runs the cloak software may be the same as that which runs the data store software, or may be a distinct machine.

A query to a data store/database for statistical analysis may be characterized as consisting of two steps. Step 1 selects from among all rows and columns a subset of rows and columns. Step 2 computes a statistical operation over the cells from one or more columns of the selected rows. Typical statistical operations include count (count the number of rows), count distinct (count the number of distinct cell values), avg (compute the average of cell values), std-dev (compute the standard deviation of cell values), sum, max (select the maximum cell value), min, median, and others.

In embodiments, the first step conceptually operates on a row-by-row basis. For each row, in such embodiments, comparison operations on cells from specified columns are performed to produce as output a Boolean TRUE or FALSE per operation. Boolean logic may then be applied to the outputs to determine if the row should be selected (TRUE) or not (FALSE). These kinds of comparison operators and Boolean logic may be found for example in the WHERE and HAVING clauses of SQL (among other clauses). As a convention, examples using the SQL WHERE clause herein should be understood to be exemplary of this row-selection process for any query language, and not limited to SQL.

An example of this is: [WHERE (age>20) AND (gender='male')]. Here, age and gender are the column names. The first comparison operation is 'greater than' performed on a numeric type, and the second is 'equal to' performed on a string. The two Booleans produced by the two comparisons are then subjected to a Boolean 'AND' operation. If the result is TRUE, then the row is selected. Otherwise the row is not selected. Typical comparison operators include =, <, >, ≤, ≥, and ≠.Typical Boolean operators include AND, OR, and NOT.

There may likewise be two main steps to anonymization in a cloak. For example, in embodiments, in the first step, rows are added to, or removed from, the set of rows that are otherwise requested by the query. This is called row adjustment. In embodiments, in the second step, the statistical operation applies some perturbation. This is called answer perturbation.

As will be appreciated, certain operations in both row adjustment and answer perturbation require a pseudo-random number. Randomness is generally required to prevent an analyst from establishing concrete facts about the data with high confidence. This pseudo-random number may come from some distribution and its associated parameters, for instance a Gaussian distribution with parameters mean and standard distribution.

Figure 3:
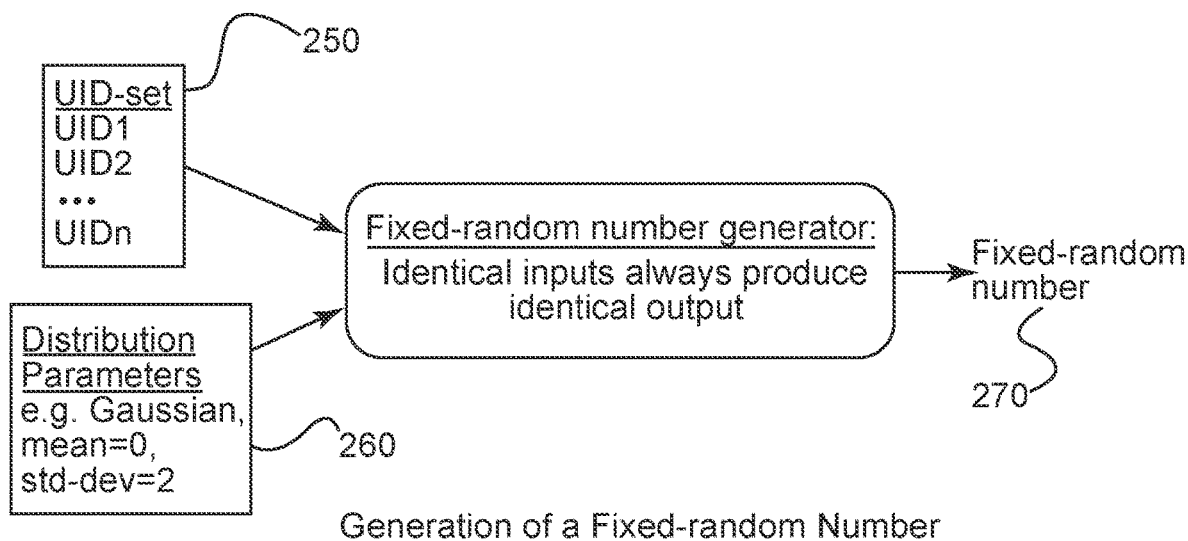
FIG. 3 shows schematically the generation of a fixed-random number in accordance with an embodiment of the invention.

Anonymization in embodiments of the cloak uses a special kind of pseudo-random number generation called fixed-random. A fixed-random number is typically generated in the context of some set of rows containing some distinct set of UIDs. Referring to FIG. 3, in embodiments, the key property of a fixed-random number may be that the number chosen is based on the distinct set of UIDs 250 (the UID-set). In other words, in embodiments, a given distribution with a given set of distribution parameters 260 and a given UID-set 250 will always produce the same pseudo-random number 270. Fixed-randomness typically prevents an analyst from trivially removing randomness from answers by causing the same answer to be repeated, and taking the average of the repeated values, thus effectively removing the uncertainty.

Figure 4:
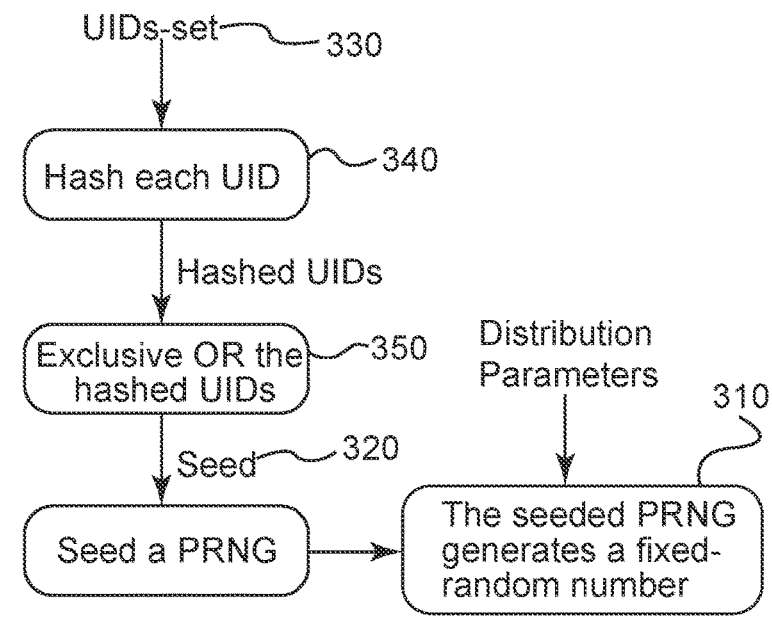
FIG. 4 shows schematically fixed-random number generation using a pseudo-random number generator in accordance with an embodiment of the invention.

Referring to FIG. 4, in one embodiment, a fixed-random number is generated by seeding the computer's pseudo-random number generator 310 with a seed 320 derived from the UID-set 330. For instance, each UID from the UID-set 330 could be hashed 340, and then the hashed UIDs could be exclusive OR'd together 350, producing a seed 320. Each hash 340 may be salted with a nonce unknown to the analyst to prevent the analyst from predicting the pseudo-random based on knowledge of the UID values.

In one embodiment, a fixed-random number is taken from a Gaussian distribution. Other distributions may also be used.

In embodiments, there may be two common usages of a fixed-random number in the cloak. One is fixed noise, and the other is the fixed threshold.

Fixed noise refers to the mechanism of adding noise to numerical answers so as to obscure the exact answer. In one embodiment, fixed noise is a fixed-random number with a mean of zero. By using a zero mean, the expected value of the answer is equal to the true answer, which is an important statistical property. Non-Gaussian distributions may also be used. Other means could also in principle be used.

A fixed threshold may be used in the cloak when a decision needs to be made based on some threshold value. For instance, if the cloak requires K distinct users to contribute to an answer, then K would be a fixed threshold (i.e. based on a fixed-random value) rather than always exactly K. In one embodiment, the fixed threshold is a fixed-random number with a mean of K. Assuming the fixed-random number is taken from a Gaussian distribution, the standard deviation is chosen such that a value of zero or less is highly improbable. For instance, the standard deviation may be selected as K/4 or smaller. In one embodiment, a hard lower bound is placed on the fixed threshold. For instance, the fixed threshold may never be less than 1 even in the case where the fixed-random number is less than 1.

Now answer perturbation is described. In embodiments, the input to the statistical operation doing answer perturbation may be a table (specifically, the table resulting from row adjustment). The table may contain at least the UID column. The table may further contain other columns as well. In embodiments, for each statistical operation (count, sum, avg, etc.), there may be a variety of possible methods for answer perturbation. Accordingly, in such embodiments, a possible method has the following three properties. First, it must be impossible or extremely unlikely for an analyst to deduce anything about individuals in the database from the operation's output. Second, the operation must be fixed in that repeated executions of the operation with the same input parameters, including the UIDs, produces the same output. Third, any answer produced by the operation must be based on the cell values of some fixed threshold number of users. Any statistical operation with these three properties may be used in an embodiment of answer perturbation in the cloak.

Now exemplary embodiments of statistical operations with the above three properties are described. Statistical operations may be classified into two types. In one type, the output of the operation is a specific cell value. This is called a single-row statistical output. Examples include min, max, and median. In the absence of anonymization, each of these statistical operations would produce a single cell's exact value. In the other type, the output of the operation is a composite of the input cells. This is called a multi-row statistical output. Examples of multi-row statistical outputs include count, sum, avg, and std-dev. The output is not normally a single cell value, but rather a value derived from all of the cell values.

For single-row statistical outputs, in embodiments, the cloak ensures that the output of the answer perturbation function is a true cell value if and only if there are some number of other cells that share that value. If there are not enough other cells that share that value, then the output of the answer perturbation function is a composite of some number of other cells.

In one embodiment, the number of other cells is a fixed threshold.

Figure 5:
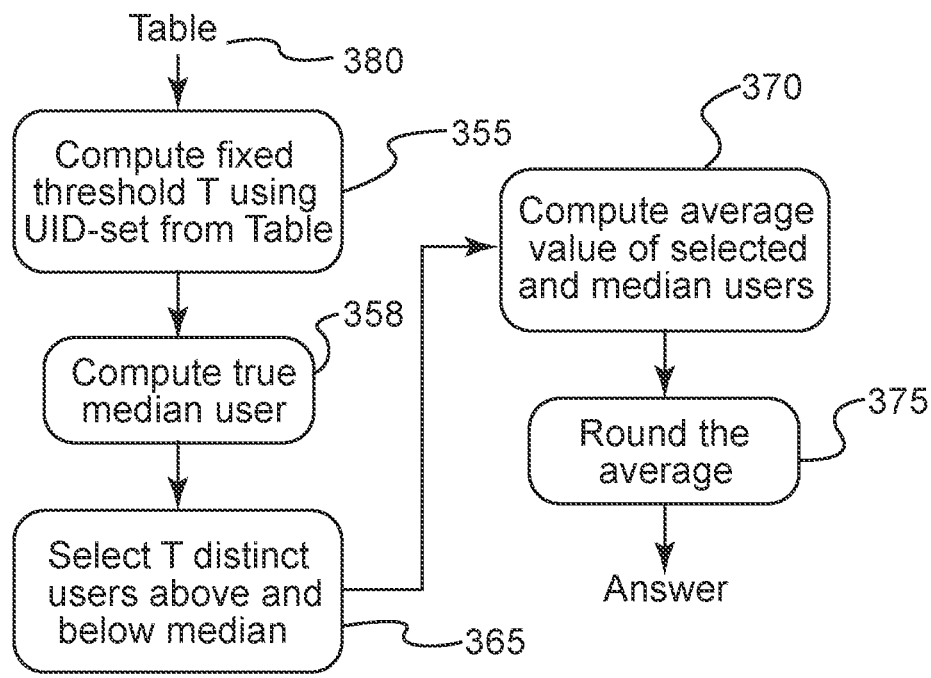
FIG. 5 shows schematically answer perturbation for the median statistical operation in accordance with an embodiment of the invention.

Referring to FIG. 5, in an exemplary embodiment of answer perturbation for the statistical operation median, the true median user is computed in step 358 from the table 380 that contains a UID column and the column from which the median is being computed (the median column). A fixed threshold T is computed in step 355 from the UID-set of the table. In an ordering of users from the median column, the T distinct users above and below the median user are selected in step 365. The average of the selected users and the median user are averaged in step 370. This average is rounded in step 375 to produce the answer.

This embodiment illustrates the three principles of answer perturbation. First, it is a fixed operation: the same input table produces the same answer. If the selected users in step 365 all have the same value, then the answer is shared by an adequate number of users (2T+1). If the selected users in step 365 do not all have the same value, then the answer is a composite from the number of users. Either way, the answer is based on a fixed threshold number of users. Finally, it is highly unlikely that the analyst can deduce anything about an individual user. This is in part because multiple users contributed to the answer, in part because the fixed threshold makes it hard for the analyst to know for instance how many users contributed, and in part because the rounding makes it hard to determine what values may have contributed to the average.

Figure 6:
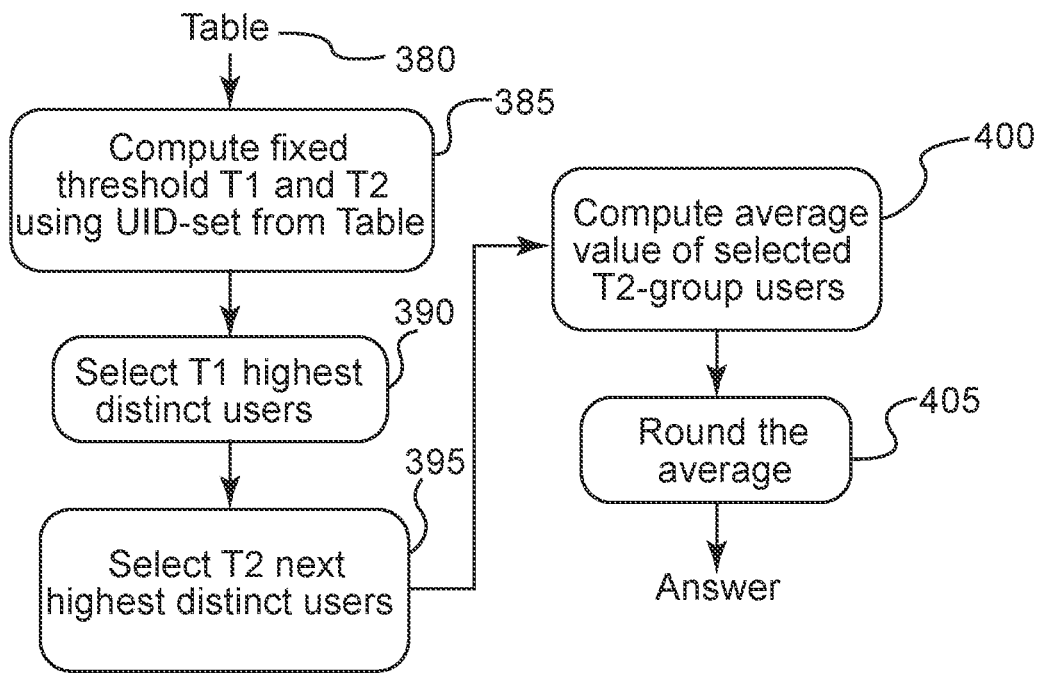
FIG. 6 shows schematically answer perturbation for the max statistical operation in accordance with an embodiment of the invention.

Referring to FIG. 6, an embodiment for the statistical operation max with answer perturbation is similar to that of the median operation. The primary difference is that a threshold T1 of the very highest values are ignored (steps 385, 390, and 395). This prevents the situation where a high outlying value skews the computed average, thus revealing information about the true max user.

Figure 7:
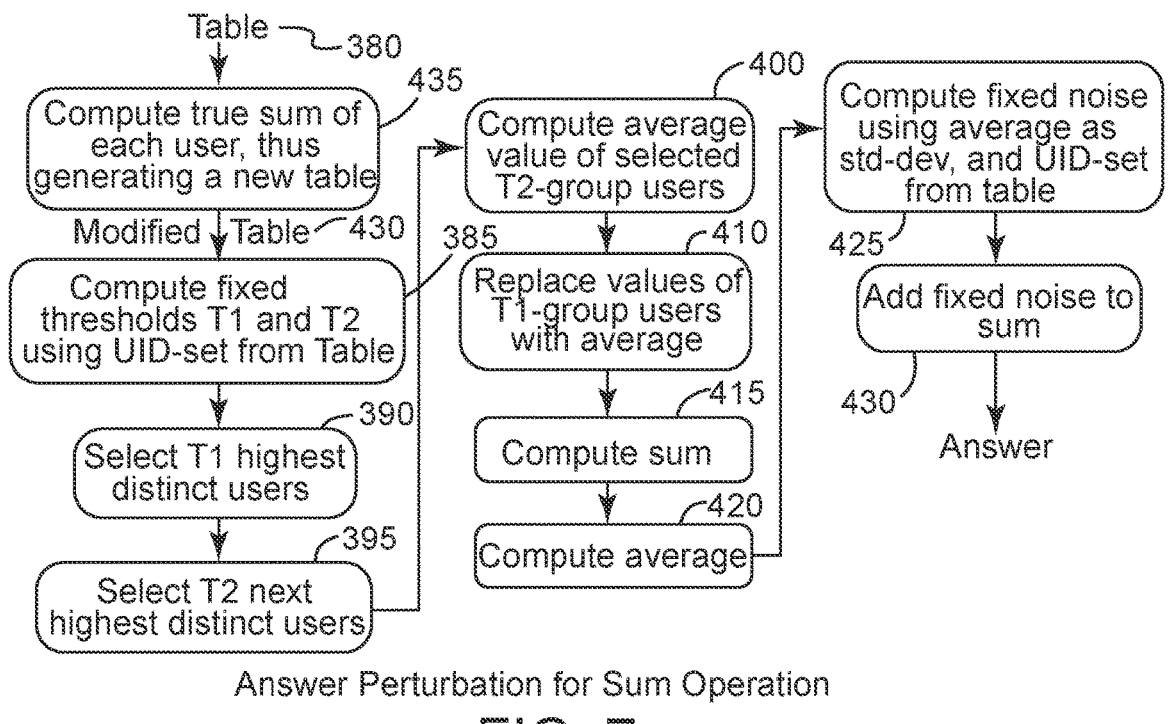
FIG. 7 shows schematically answer perturbation for the sum statistical operation in accordance with an embodiment of the invention.

Referring to FIG. 7, a multi-row statistical operation with answer perturbation for the sum is shown. Here, all values are assumed to be positive. In the first step 435, the sum of each individual user is computed, thus creating a modified table 430 where instead of potentially multiple rows per user, there is a single row per user containing that user's sum. Working from this modified table, two groups of users with the highest values are selected in steps 385, 390, and 395, and the average of the second group is computed in step 400. These are analogous to the same steps done in the max operation. In step 410, the values of the first group are replaced with the average taken from the second group. This removes the effect of the highest users, while still contributing something from these users. In steps 415 and 420, the sum and average over all cells in the table are computed. Step 425 generates fixed noise based on the original table's UID-set, using as the standard deviation for the noise the average computed in step 420. Finally, step 430 adds that noise to the sum, thus producing the answer.

In the case where there are positive and negative values, the operation of FIG. 7 may be executed twice, once for positive numbers and once for the absolute values of the negative numbers. The final answer is then the latter subtracted from the former.

In embodiments, the three principles for answer perturbation are satisfied. As will be appreciated, in embodiments, it is a fixed operation. Accordingly, in embodiments, every intermediate value may be based on a set of users, either the T1 and T2 highest users (400 and 410), or the complete set of users (415 and 420). Thus, as will be further appreciated, in embodiments, removing the effect of outliers, as well as adding noise proportional to the average contribution of any user, makes it very unlikely that anything can be deduced about individual users.

Further, in embodiments, the count statistical operation may be very similar, except instead of computing the sum of values per individual user (step 435), the number of rows per individual user is used instead.

Note that the embodiments of the median, max, min, sum, and count operations are exemplary and used here as examples to illustrate the principles of a fixed operation, of deriving an answer from a set of users, and of making it very unlikely that information about an individual user can be deduced from the answer. Many other specific embodiments with the same principles, for these and other statistical operations, should be apparent to a one skilled in the art.

The answer perturbation methods described provide strong anonymity with respect to a single answer, or the same answer repeated. It may not, however, provide strong anonymity with respect to comparing the difference between pairs of answers. This is because of the inverse of the fixed operation principle: If two queries using the same statistical operation over the same column from the same database produce different answers, then it must be that the UID-set for the two queries is different. This fact can be exploited by an analyst to discover something about individual users.

As an example, consider the case where an analyst wishes to discover if a given user, the victim, has a given attribute, for instance whether the victim has been diagnosed with AIDS. Suppose that the analyst can form two queries. One query contains all of the users that have AIDS, but explicitly excludes the victim (whether or not the victim has AIDS). A second query contains all of the users that have AIDS. If the victim has AIDS, then he or she will be included in the answer of the second query, but not the first. Therefore, if the two answers are different, the analyst can confidently conclude that the victim has been diagnosed with AIDS.

This kind of attack is called a difference attack. The purpose of row adjustment is to defend against difference attacks.

The basic idea behind row adjustment derives from the observation that two queries in an attack pair must differ by a single user, the victim. Given this, row adjustment actively tests modifications of a given query to see if those modifications result in a small difference between the original query's answer and the modified query's answer. If the difference is small, then the rows that constitute the difference are adjusted so as to remove the difference between the original query and the modified query.

For example, suppose that a query checks for the comparisons [(disease='AIDS') AND (job_title≠'CEO')]. A modification of this query would be to remove the comparison (disease =AIDS) from the query. Doing so would result in a very different table, since most people have not been diagnosed with AIDS and would therefore be included in the modified table. Thus, in embodiments, the cloak can conclude that this modified query and the original query do not constitute a difference attack. Another modification may be to remove the comparison (job_title≠'CEO') from the query. Assuming that there is only one CEO, this change may result in a table that differs by either zero or one user (depending on whether the CEO does not have or has AIDS respectively). Thus, in such embodiments, the cloak may conclude that the modified query and the original query constitute a difference attack. As a result, it may adjust rows to match the table produced without (job_title≠'CEO').

These types of comparisons are herein referred to as attack components. An attack component is any component of the query for which there is a reasonable risk that the component can be exploited by the analyst to form a difference attack. There are two types of attack components, adjustable and removable. The example above uses removable attack components: the attack components are removed to form the pair of attack queries. Adjustable attack components are created from ranges by adjusting the size or offset of the range. The following pertains to difference attacks with removable attack components. After that, adjustable attack components are described.

Figure 8:
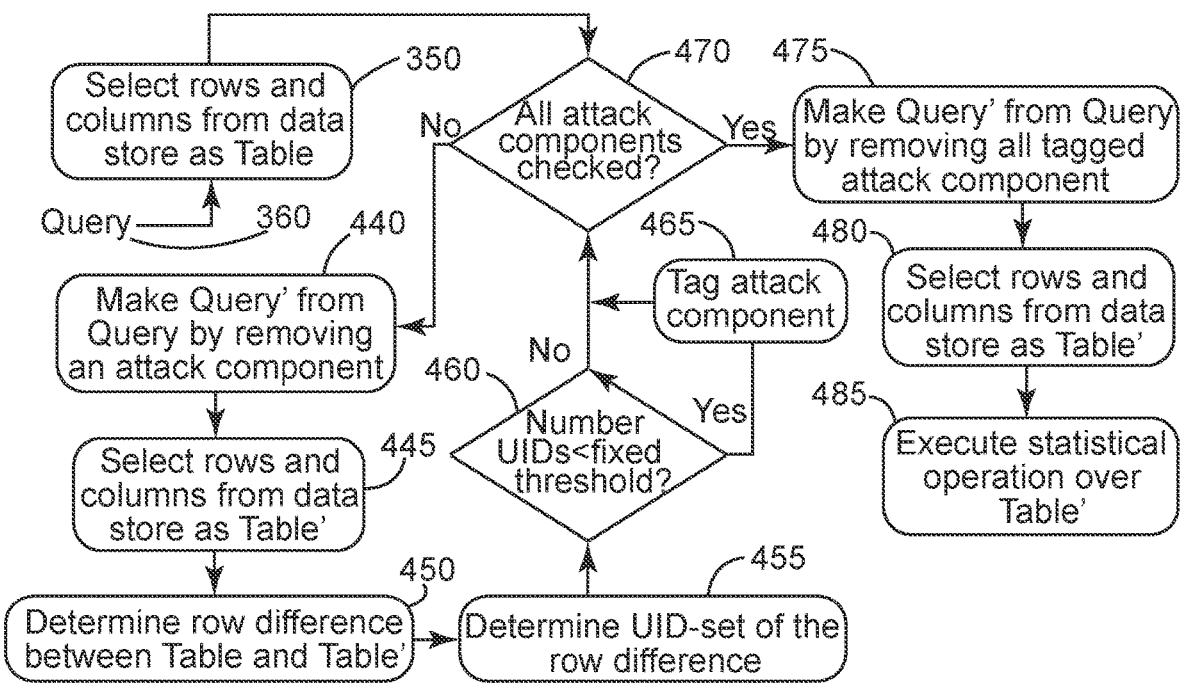
FIG. 8 shows schematically row adjustment for attack components in accordance with an embodiment of the invention.

FIG. 8 illustrates an embodiment of row adjustment with removable attack components. The procedure takes as input a query 360 which is used by the cloak to select rows and columns 350 from the data store. The query 360 may be received for instance from an analyst, or from an application. The procedure next enters a loop whereby it generates modified queries and checks to see if the difference between the tables produced by the modified query and the original query differ by a fixed threshold. Each such modification is made by removing an attack component (step 440), producing a new query called query'. In step 445, the rows and columns for query' are selected from the data store, producing a new table called table'.

In step 450, the rows that differ between table and table' are determined. In step 455, the UID-set of these differing rows is determined. A fixed threshold is generated based on the UID-set, and is step 460 the number of UIDs in the UID-set is compared against the threshold. If the number of UIDs is smaller than the threshold, then the attack component is tagged in step 465 so that later it may be removed from the query used to produce the final answer.

In step 470, a determination is made as to whether there are more attack components to be examined or not. If not, the loop continues with step 440. Otherwise, the loop is exited. Note that if the original query had no attack components at all, then the loop (440, 445, 450, 455, 460, and 465) may never be executed. Once the loop is exited, all attack components that cause the number of distinct UIDs to fall below the threshold will have been tagged. In step 475, a final query called query' is generated by removing all of the tagged attack components from the original query. The table resulting from this query, called table', is generated in step 480 and used as input to the statistical operation defined by the original query in step 485.

In embodiments, the cloak is able to identify the attack components in a query (whether removable or adjustable). This means that the query language may be constrained to include only attack components that the cloak can identify. For instance, in embodiments, the query language may not be a fully-general Turing-complete language, because it is beyond the state of the art to efficiently identify every possible attack component. As another example, in embodiments, the mathematical operations available to the query language may be limited so that Boolean logic can only be specified in the WHERE or HAVING clauses using AND, OR, and NOT.

In an embodiment, the cloak examines queries that it receives to ensure that the query is constrained to so that the cloak can identify all attack components. Queries that do not pass this examination may be rejected by the cloak.

Not all comparisons in a query are necessarily attack components. For instance, an SQL query may JOIN two tables on some condition, for instance where the social security number in both tables is the same (tab 1 JOIN tab2 WHERE tab 1.ssn=tab2.ssn). As will be appreciated, in embodiments, it may be assumed that it is not possible, under any reasonable expected circumstances, for an analyst to use that comparison to manipulate the presence of absence of a single user.

One skilled in the art will recognize that it is not always the case that a single comparison of a cell with a number or a string, taken alone, constitutes an attack component. Rather, under certain conditions it can be a set of such comparisons that constitutes an attack component. For instance, consider [WHERE disease='AIDS' OR (name='Paul' AND date_of_birth='1957-12-14' AND zipcode=48442)]. In this case, none of the AND'd comparisons alone could be used for a difference attack. Rather, it is the AND'ing of all three, combined with the OR, that can be used for the attack. In an embodiment, a group of AND'd equalities constitute a single attack component when coupled with an OR.

In an embodiment, a group of OR NOT equalities constitute a single attack component when coupled with an AND. For instance, in [WHERE disease='AIDS' AND (NOT name='Paul' OR NOT date_of_birth='1957-12-14' OR NOT zipcode=48442)], none of the individual NOT equalities alone is an attack component, but rather all three combined.

In the above examples, exact matches, or their inverse, were used as the comparison for the removable attack component. One skilled in the art will recognize that when dealing with numbers, including dates and times, a range can be used as well. For instance, the following AND'd group using ranges is also a removable attack component: [WHERE disease='AIDS' OR (name='Paul' AND date_of_birth>'1957-12-12' AND date_of_birth<'1957-12-16' AND zipcode>48440 AND zipcode<48444)].

In embodiments, adjustable attack components are formed by growing or shrinking a range by an amount that includes or excludes only the victim. For instance, if an analyst knows that the victim has a salary of exactly $135,225, and is the only person in the data store with that salary, then the analyst can form a difference attack using two queries with the following WHERE clauses: [WHERE disease='AIDS' AND salary<135225], and [WHERE disease='AIDS' AND salary<135226]. Here, the query with the former WHERE clause excludes the victim, and the query with the latter is adjusted to include the victim if he or she has an AIDS diagnosis.

To defend against this, an embodiment of the cloak uses snapped alignment. The basic idea here is that ranges are limited to pre-determined (snapped) allowable alignments. Both the size of ranges and the offset of ranges are limited in this way. An example of snapped alignments would be one whereby range sizes are constrained to being one of $2^n$ and $\frac{1}{2}^n$, and the offset is limited to being an even multiple of $2^n$ and $\frac{1}{2}^n$ respectively, where n is an integer (0, 1, 2, etc.). Examples of allowed ranges under this definition are 8-16, 2-3, and 100.5-100.75. Ranges that are disallowed under this definition are 2-5 (range of size 3 not allowed) and 9-17 (range of size 8 must be aligned on a multiple of 8). To add some flexibility while still constraining the ranges, the ability to shift the offset of any range by ½ the size of the range could be allowed. This would then allow for instance the range 4-12 (size 8, shifted by 4), but still not 9-17.

One skilled in the art will see that many different definitions of snapped alignments are possible. For instance, in the case of dates and times, the alignments could be along natural time unites like seconds, minutes, hours, days, months, and years. Or the alignment could be more decimal-based, allowing for instance sizes and offsets from the following set: $1 \times 10^n$, $2 \times 10^n$, $5 \times 10^n$, where n is a positive or negative integer.

In an embodiment, the query itself must conform to snapped alignment. Any inequality must specify both the high and low ends of the range, and the range must be snapped. A query that does not conform may be dropped. Alternatively, the range may be modified by the cloak to fit to a snapped alignment. In an embodiment, the query itself specifies only the high or low end of the range, but not both. The unspecified end of the range is implicitly taken to be plus or minus infinity. Because infinity is not a valid snapped alignment, in embodiments, the cloak may determine the appropriate value of the unspecified end of the range, and set the snapped alignment accordingly. In an embodiment, the cloak establishes the unspecified end of the range as the min or max statistical operation with answer perturbation.

While snapped alignment eliminates the possibility of most difference attacks based on range adjustment, it may not eliminate all. For instance, consider a case where the highest-paid employee has a salary of $1,750,000, and the next highest paid employee has a salary of $1,150,000. Assuming here the decimal-based snapped alignment described above, the analyst could attack the highest-paid employee using a difference attack with the following two WHERE clauses, [WHERE disease='AIDS' AND salary>=1000000 AND salary<2000000], and [WHERE disease='AIDS' AND salary>=1000000 AND salary<1500000]. The latter query definitely excludes the highest-paid employee, and the former includes that employee if he or she has AIDS. However, both queries have snapped alignment.

To defend against this, an embodiment of the cloak uses a form of row adjustment called shrink-and-drop. The basic idea is that the cloak checks enclosed smaller snapped ranges to see if the answer to a query that used the smaller snapped range would differ only slightly from that of the original query. This concept is similar to that of row adjustment described in FIG. 8. The difference is that, whereas in FIG. 8 potential attack queries are generated by dropping attack components, with shrink-and-drop, potential attack queries are generated by shrinking ranges.

Specifically, in embodiments, for each original range (range in the original query), a series of sub-ranges may be defined that overlap with the original range in order of largest overlap to smallest overlap. The cloak may then test each sub-range in the series in order using the loop of FIG. 8, but by replacing the original range with the sub-range instead of removing an attack component (i.e. in step 440). If the resulting UID-set of the row difference does not fall below the fixed threshold (step 460), then it is not necessary to check still smaller overlapping sub-ranges because the smaller sub-ranges would also not fall below the fixed threshold. When there are no more sub-ranges to check, the original query is modified to be the smallest sub-range with a below-threshold difference. If all sub-ranges had a below-threshold difference, then the entire range may be dropped from the modified query.

By way of example, assume the highest-paid employee (the victim) has a salary of $1,750,000, and the next highest paid employee has a salary of $1,150,000, and that there are a substantial number of employees with salaries between $1,000,000 and $1,150,000. Assume the decimal-based snapped alignment (i.e. $1 \times 10^n$, $2 \times 10^n$, $5 \times 10^n$). The original query contains the range $1,000,000-$2,000,000. The cloak first tests sub-range $1,500,000-$2,000,000. The difference does not fall below the fixed threshold, because the difference between the two queries includes the substantial number of employees in the $1,000,000-$1,500,000 range. Because this sub-range does not fall below the fixed threshold, the cloak does not need to try still smaller sub-ranges within $1,500,000-$2,000,000 sub-range, because no such sub-range would fall below the fixed threshold.

Next the cloak may test the sub-range $1,000,000-$1,500,000. The row difference between the original query and this query does fall below the fixed threshold because there is only one employee in the range $1,500,000-$2,000,000. As a result, the cloak may further test a still smaller sub-range, this time $1,000,000-$1,200,000. This also falls below the fixed threshold, and so the cloak may try the sub-range $1,000,000-$1,100,000. Assuming that this does not fall below the fixed threshold, the cloak may tag the sub-range $1,000,000-$1,200,000 as being the smallest sub-range so far that falls below threshold. The cloak may also try ranges $1,200,000-$1,400,000 and $1,400,000-$1,500,000, since these are also valid snapped alignments. Neither of these would fall below the fixed threshold. Therefore, the cloak may modify original range of $1,000,000-$2,000,000 to be $1,000,000-$1,200,000.

If the example is modified so that there are not a substantial number of employees in the $1,000,000-$1,150,000 range, then the first two sub-ranges tested by the cloak, $1,000,000-$1,500,000 and $1,500,000-$2,000,000, would both fall below the fixed threshold, and so the cloak may remove the original range from the query altogether.

One skilled in the art will recognize that the operation of FIG. 8, both as is (for removable attack components) or modified to apply to shrink-and-drop (for adjustable attack components), is descriptive, not prescriptive. In other words, there may be many ways of implementing the operation that does not follow the precise steps of FIG. 8, as long as the outcome is the same. For instance, the cloak may not literally select rows and columns from the data store once for every checked attack component. Rather, the cloak may select all of the necessary rows and columns all in one access, building a sort of super-table. Likewise, rather than determining the row difference in a distinct operation for each attack component, the cloak may scan this super-table once, and check for row differences for all attack components in parallel.

A limitation of snapped alignment is that a given snapped-aligned range may differ significantly from the range stated in the original query. In an embodiment, the cloak modifies the range in the original query by matching or nearly matching the original range with multiple OR'd snapped-aligned ranges, where shrink-and-drop is executed on each snapped-aligned range.

For example, suppose that the original query specified a range with [WHERE col >=17 AND col<31]. Assuming the decimal-based snapped alignment (i.e. $1 \times 10^n$, $2 \times 10^n$, $5 \times 10^n$), a WHERE clause comprised of a set of snapped-aligned ranges that match the original range would be [WHERE (col>=17 AND col<18) OR (col>=18 AND col<20) OR (col>=20 AND col <30) OR (col>=30 AND col<31)]. Shrink-and-drop would then be run on each of the four OR'd snapped-aligned range.

Up to this point, queries have been described as though any given query produces a single answer: in other words that the query selects rows to produce a single table, and this table is subject to a statistical operation with answer perturbation. Many query languages however allow the rows to be grouped in some way, with the statistical operation applied to each such group. For instance, in SQL, this is done with the GROUP BY clause. An example of this is [SELECT age, count(*) FROM table GROUP BY age]. This query reports the count of the number of rows separately for each distinct age.

In embodiments, each such grouping may be treated like a separate table by the cloak's answer perturbation function. In other words, the table 380 from FIG. 5, FIG. 6, and FIG. 7 is understood to be that of each grouping. Grouping can cause the value of the cell itself to be reported (age, in the above example). This can cause a privacy problem, because the cell value itself might be sensitive information for a single user. To protect against this, an embodiment of the cloak suppresses the output of cell values when the number of UIDs in the UID-set of the grouping for the cell value falls below a fixed threshold. The fixed threshold is based on the UID-set of the group's table. This operation applies to any table input to a statistical operation with answer perturbation, not just those resulting from a grouping function.

Groupings can be based on ranges of cell values rather than specific cell values. For instance, the following SQL query would create groups of ages 0-9, 10-19, and so on: [SELECT floor(age/10)*10 AS age_group, count(*) FROM table GROUP BY age_group]. In an embodiment, the cloak ensures that any such range groupings adhere to snapped alignment. Queries whose range groupings do not adhere to snapped alignment may be dropped. Alternatively, the range groupings can be modified to adhere to a similar snapped alignment.

Finally, it is also to be understood that the cloak, and/or or other computing devices disclosed herein, may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the cloak may include a controller having at least one processor and system memory/data storage structures, which may include random access memory (RAM) and read-only memory (ROM). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for adapting the at least one processor to perform the methods disclosed herein may be read into a main memory of the at least one processor from a computer-readable medium. The term "computer-readable medium", as used herein, refers to any medium that provides or participates in providing instructions to the at least one processor (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. An anonymizing method for a database system, comprising the steps of:
    receiving a query;
    identifying attack components in the query by inspecting the instruction set defining the query, the attack components comprising a query conditional expression including operators and logic to determine if any given row in a database would be included or excluded from a set of rows comprising an answer to the query;
    for each of said attack components, determining a number of distinct changed UIDs that would exist if said attack component were removed or adjusted, wherein a changed UID is one excluded from said set of rows that would be included, or one that is included in said set of rows that would be excluded;

for each of said attack components where said number of distinct changed UIDs is less than a fixed threshold, adding or removing rows that would be changed if said attack component were removed or adjusted, wherein a changed row is one excluded from said set of rows that would be included, or one that is included in said set of rows that would be excluded, and wherein the fixed threshold is derived from a noise value that is determined by a set of distinct changed UIDs, wherein two identical sets of distinct changed UIDs result in the same noise value;

applying a statistical operation to the resulting rows; and outputting a resulting answer.

2. The method according to claim 1, further comprising the steps of:
inspecting the query to ensure that the query is constrained in such a way that all attack components may be identified; and
rejecting the query if the query is not so constrained.

3. The method according to claim 1, further comprising the step of:
rejecting the query if an identified attack component is a range that does not conform to a snapped alignment.

4. The method according to claim 1, further comprising the step of:
modifying an identified attack component in the query to be a range that conforms to a snapped alignment.

5. The method according to claim 4, wherein:
said identified attack component specifies only one side of a range; and
said modification adds the other side of the range.

6. The method according to claim 4, wherein:
said modification partitions the range into multiple OR'd ranges that individually conform to the snapped alignment.

7. The method according to claim 1, wherein:
an identified attack component is a range; and
the method further comprises adjusting the identified attack component by finding overlapping sub-ranges that are snapped alignments, and shrinking the range to exclude parts of the range that lead to a small UID difference.

8. The method according to claim 1, wherein said step of outputting a resulting answer comprises:
computing a set of distinct UIDs from the UIDs of said resulting rows;
computing fixed noise from said set of distinct UIDs;
perturbing said resulting answer with said fixed noise; and
outputting said perturbed answer.

9. The method according to claim 8, wherein:
an amount of the fixed noise is enough to obscure the effect of individual user data.

10. The method according to claim 1, further comprising the steps of:
computing a set of distinct UIDs from the UIDs of said resulting rows;
computing a fixed threshold from said set of distinct UIDs; and
suppressing the answer if a number of distinct UIDs falls below the fixed threshold.

11. The method according to claim 1, further comprising the step of:
rejecting the query if the query groups according to a range that does not follow a snapped alignment.

12. The method according to claim 1, further comprising the step of:
modifying the query if the query groups according to a range that does not follow a snapped alignment so that the grouping does follow the snapped alignment.

13. A non-transitory computer readable medium storing instructions configured to adapt a controller that includes at least one processor and a memory device to:
receive a query;
identify attack components in the query, the attack components comprising a query conditional expression including operators and logic to determine if any given row in a database would be included or excluded from a set of rows comprising an answer to the query;
for each of said attack components, determine a number of distinct changed UIDs that would exist if said attack component were removed or adjusted, wherein a changed UID is one excluded from said set of rows that would be included, or one that is included in said set of rows that would be excluded;
for each of said attack components where said number of distinct changed UIDs is less than a fixed threshold, add or remove rows that would be changed if said attack component were removed or adjusted, wherein a changed row is one excluded from said set of rows that would be included, or one that is included in said set of rows that would be excluded, and wherein the fixed threshold is derived from a noise value that is determined by a set of distinct changed UIDs, wherein two identical sets of distinct changed UIDs result in the same noise value;
apply a statistical operation to the resulting rows; and
output a resulting answer.

14. The non-transitory computer readable medium of claim 13, wherein the stored instructions are further configured to adapt the controller to:
inspect the query to ensure that the query is constrained in such a way that all attack components may be identified; and
reject the query if the query is not so constrained.

15. The non-transitory computer readable medium of claim 13, wherein the stored instructions are further configured to adapt the controller to:
compute a set of distinct UIDs from the UIDs of said resulting rows;
compute a fixed threshold from said set of distinct UIDs; and
suppress the answer if a number of distinct UIDs falls below the fixed threshold.

16. A hardware system for anonymizing results to a query, comprising: at least one processor; and a memory device that stores an application that when loaded into the at least one processor adapts the application to: receive a query; identify attack components in the language forming the query, the attack components comprising a query conditional expression including operators and logic to determine if any given row in a database would be included or excluded from a set of rows comprising an answer to the query; for each of said attack components, determine a number of distinct changed UIDs that would exist if said attack component were removed or adjusted, wherein a changed UID is one excluded from said set of rows that would be included, or one that is included in said set of rows that would be excluded; for each of said attack components where said number of distinct changed UIDs is less than a fixed threshold, add or remove rows that would be changed it said attack component were removed or adjusted, wherein a changed row is one excluded from said set of rows that would be included, or one that is included in said set of rows that would be excluded, and wherein the fixed threshold is derived from a noise value-that is determined by a set of distinct changed UIDs, wherein two identical sets of distinct changed UIDs result in the same noise value; apply a statistical operation to the resulting rows; and output a resulting answer.

17. The system of claim 16, wherein the application is further adapted to:
   inspect the query to ensure that the query is constrained in such a way that all attack components may be identified; and
   reject the query if the query is not so constrained.

18. The system of claim 16, wherein the application is further adapted to:
   compute a set of distinct UIDs from the UIDs of said resulting rows;
   compute a fixed threshold from said set of distinct UIDs; and
   suppress the answer if a number of distinct UIDs falls below the fixed threshold.

* * * * *